United States Patent
Moszkowski et al.

(10) Patent No.: US 6,776,560 B2
(45) Date of Patent: Aug. 17, 2004

(54) FLEX J-LAY TOWER

(76) Inventors: Mark Moszkowski, 1902 Ashford Hollow, Harris County, TX (US) 77077; Benton F. Baugh, 14626 Oak Bend, Harris County, TX (US) 77079-6441

( * ) Notice: Subject to any disclaimer, the term of this patent is extended or adjusted under 35 U.S.C. 154(b) by 0 days.

(21) Appl. No.: 10/167,891

(22) Filed: Jun. 13, 2002

(65) Prior Publication Data

US 2003/0231931 A1 Dec. 18, 2003

(51) Int. Cl.[7] .................................................. F16L 1/12
(52) U.S. Cl. ....................................... 405/166; 405/170
(58) Field of Search ................................ 405/158, 166, 405/169, 170, 168.1, 167

(56) References Cited

U.S. PATENT DOCUMENTS

| | | |
|---|---|---|
| 3,331,212 A | 7/1967 | Cox et al. |
| 3,472,034 A | 10/1969 | Lawrence |
| 3,524,326 A | 8/1970 | Craste |
| 3,555,835 A * | 1/1971 | Smith ........................ 405/167 |
| 3,581,506 A | 6/1971 | Howard |
| 3,602,175 A | 8/1971 | Morgan et al. |
| 3,680,322 A | 8/1972 | Nolan, Jr. et al. |
| 3,747,356 A | 7/1973 | Lochridge et al. |
| 3,860,122 A | 1/1975 | Cernosek |
| 3,937,334 A | 2/1976 | Bleyl et al. |
| 4,068,490 A * | 1/1978 | Jegousse ..................... 405/166 |
| 4,091,629 A | 5/1978 | Gunn et al. |
| 4,202,653 A | 5/1980 | Moller |
| 4,324,194 A | 4/1982 | Elliston |
| 4,340,322 A | 7/1982 | Springett et al. |
| 4,347,029 A | 8/1982 | Latimer et al. |
| 4,472,079 A * | 9/1984 | Langner ..................... 405/167 |
| 4,486,123 A | 12/1984 | Koch et al. |
| 4,569,168 A | 2/1986 | McGovney et al. |
| 4,704,050 A | 11/1987 | Wallace |
| 4,917,540 A | 4/1990 | Recalde |
| 5,000,416 A | 3/1991 | Fantasia |
| 5,145,289 A | 9/1992 | Titus |
| 5,421,675 A | 6/1995 | Brown et al. |
| 5,458,441 A | 10/1995 | Barry |
| 5,464,307 A | 11/1995 | Wilkins |
| 5,527,134 A | 6/1996 | Recalde |
| 5,603,588 A | 2/1997 | Herbert |
| 5,971,666 A | 10/1999 | Martin et al. |
| 6,213,686 B1 | 4/2001 | Baugh |
| 6,273,643 B1 | 8/2001 | Baugh |
| 6,293,732 B1 | 9/2001 | Baugh |

FOREIGN PATENT DOCUMENTS

GB        1178219        1/1970

* cited by examiner

Primary Examiner—Michael Safavi

(57) ABSTRACT

A method for j-laying a pipeline from an offshore vessel to the floor of the ocean comprising a multiplicity of winches for supporting the upper end of the pipeline at its natural hanging angle, a mast in a fixed angle to the vessel, holding new pipe section in the mast for welding to the upper end of the pipeline, and flexing the lower end of the new pipe section into alignment with the upper end of the pipeline to allow welding to the pipeline and flexing the remainder of the new pipe section to remain within the mast.

27 Claims, 4 Drawing Sheets

FLEX J-LAY TOWER

BACKGROUND OF THE INVENTION

Underwater pipelines can be continuously laid from a surface vessel employing S-Lay, Natural J-Lay or Forced Vertical J-Lay mechanical arrangements. Each of these methods have the pipeline being laid approaching the ocean floor in a catenary curve.

S-Lay systems have the pipeline bent back from its near catenary curve to an almost horizontal position where strings of pipes can be added on a vessel deck. Natural J-Lay systems (called J-Lay systems in short) keep the pipeline in its natural near catenary attitude. New pipes have to be brought up at a slanting angle to match the angle of the upper end of the pipeline in the water. Forced Vertical J-Lay systems have the top end of the pipeline bent further from the near catenary curve so as to bring it to a vertical position where new pipes can to be added in a vertical tower.

Both the first and the third type use so-called "stingers" to bend the pipeline to the desired attitude for welding new pipe sections. The second type requires a pipe clamping device sometimes also called improperly a "stinger".

S-Lay arrangements offer the definite advantage of a near horizontal pipeline on vessel deck, allowing in-line multiple welding, testing and coating stations but require long and, in deep water, deep, expensive and relatively fragile stingers to bend the pipe from its natural no moment angle in the water to the near horizontal on the vessel deck.

Forced Vertical J-Lay systems allow the use of fixed vertical pipe laying towers but also require a sometimes very deep stinger. In addition, keeping the stingers within reasonable dimensions sometimes induce plastic deformation of the pipe, or permanent plastic deformation. In large diameter pipelines, the moment required to handle the upper end of the pipeline can be substantial.

Natural J-Lay systems do not require genuine stingers, strictly speaking, but at the cost of a neither horizontal nor vertical laying attitude, thus involving complex articulated towers. Current natural J-Lay arrangements demand the provision of complex upending or erecting strongback arms to bring new pipes or strings of pipes to a non horizontal variable position where they are jointed to the existing deployed pipeline.

The three kinds of arrangements require that the pipeline total weight be supported above deck in clamps or friction tensioners, the weight of the pipe being held back from the bottom or the top of the systems. Whether J-Laying or S-Laying, that provision is a real drawback when the job calls for the installation of large manifolds inline, as the size of the manifold is bound to be limited by the dimensions of the tensioning or weight holding device. In addition, near vertical J-Lay arrangements where the weight of the deployed pipeline is supported from the top of the tower require very strong structures, thus limiting the overall capacity of the system.

Natural J-Lay Systems have historically been designed as modified onshore drilling rigs. Little of the specific marine environment taken into consideration and all operations are carried on above vessel deck level until the pipeline is eventually lowered into the water. Those systems use drawworks, ram-rig type cylinders or near vertical friction pipe tensioners to hold back the weight of the deployed pipeline, strongback pipe erectors to upend new strings of pipe and rotating articulated masts to allow for a variable pipe angle at water level. In addition, some designs integrate mechanical gimballing of the whole system to compensate for weathervaning vessel rotation.

SUMMARY OF THE INVENTION

The object of this invention is to provide a system for laying pipeline from a vessel with a tower at a fixed angle, but allowing the lower end of the new pipe sections to be aligned with the suspended pipeline by flexing the new pipe sections.

A second object of the present invention is to suspend the pipeline with a multiplicity of winches.

A third object of the present invention is to allow weathervaning of the vessel around the suspended pipeline.

Another object of the invention is to suspend the load of the pipeline below the deck of the vessel rather than above the deck of the vessel.

Another object of the invention is to allow for handling of relatively large subsea packages in the work area while handling the load of the pipeline below the working table area.

Another object of the invention is to provide an area to feed relatively short pipe sections into the tower for welding together in the tower.

Another object of the present invention is to provide the ability to lay pipelines at a variety of angles from a fixed angle tower, without requiring the inducement of a moment on the top of the pipeline.

Another object of the invention is to do the required pipe bending on the portion of the pipeline which is not under tension.

DESCRIPTION OF THE PREFERRED EMBODIMENT

Figure 1:
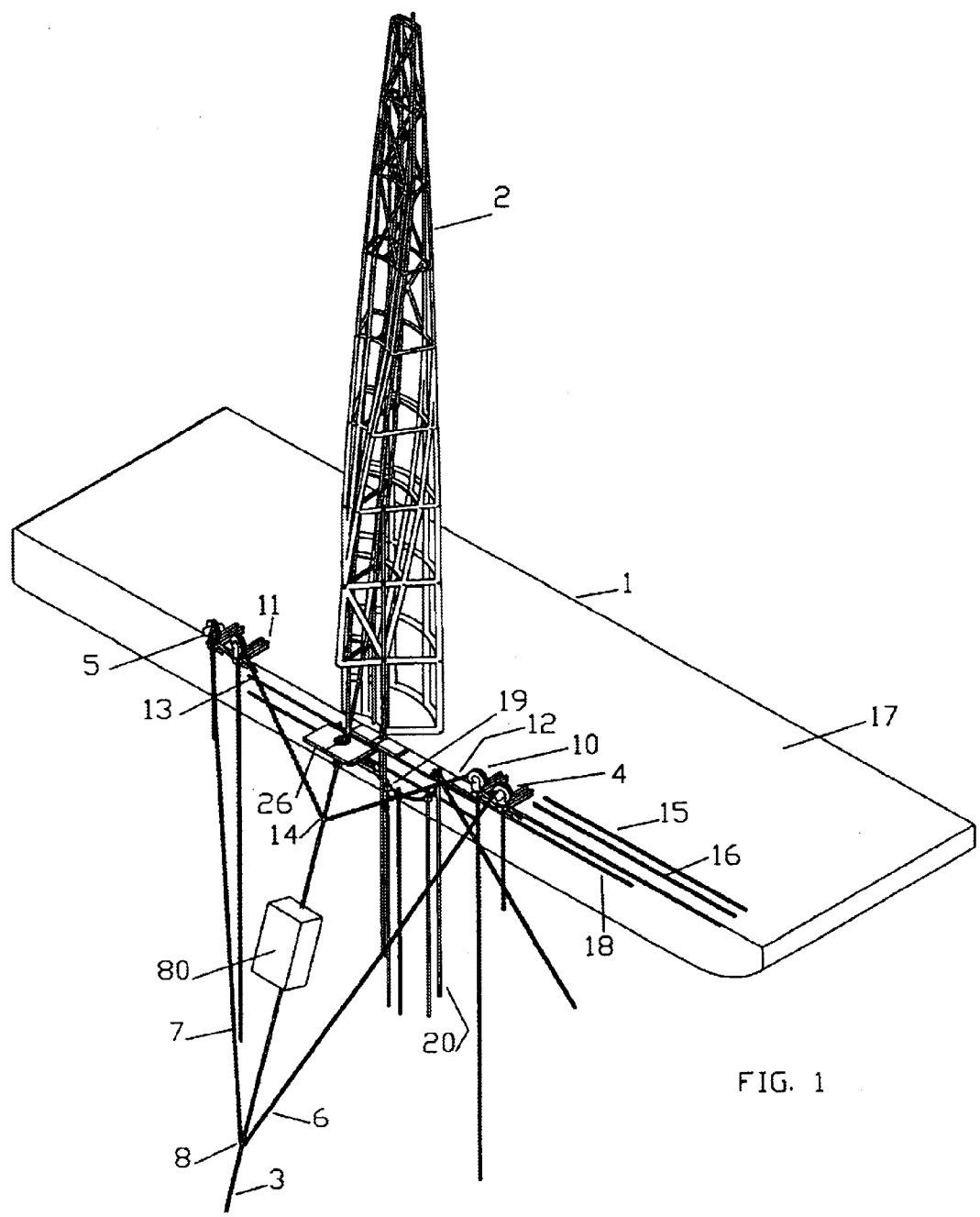
FIG. 1 is a perspective view of a system of this invention.

Referring now to FIG. 1, a vessel 1 is shown having mast 2 rigidly attached. A pipeline 3 is suspended into the seawater by winches 4 and 5 cooperating with chains 6 and 7 and with connector 8. The pipeline 3 is also suspended by winches 10 and 11 cooperating with chains 12 and 13 and with connector 14. Connectors 8 and 14 are releasable types as are well known in the industry. The pipeline 3 is lowered by releasing one connector, i.e. 8 and lowering chains 12 and 13 by winches 10 and 11 respectively. While the pipeline 3 is being lowered, the winches 4 and 5 pull chains 6 and 7 up along with connector 8 to the top of its stroke. At that time connector 8 will be relocked and connector 14 will be released and the process repeated. In this type of "hand over hand" operation, the pipeline will be lowered.

New pipe sections 15 and 16 are shown on the deck 17 of vessel 1. New pipe section 18 has been moved to engage a track 19 and is shown swung down into the water as new pipe section 20.

Figure 2:
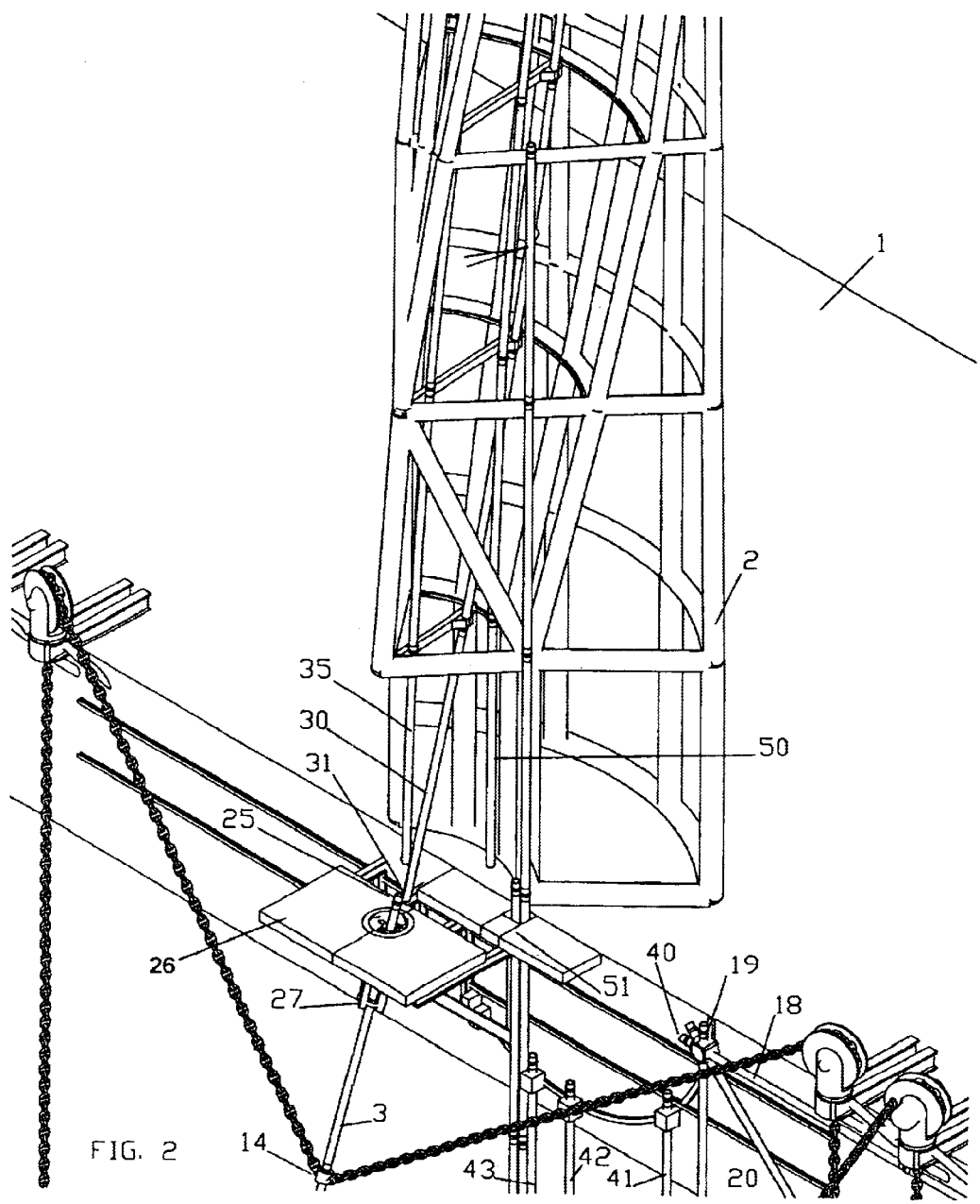
FIG. 2 is a perspective view of the work table area.

Referring now to FIG. 2, the upper end 25 of pipeline 3 is shown going thru a split work table 26 and thru a split stinger 27. Stingers of conventional designs are usually utilized to assist in bending of the upper end of the pipeline under high tension to allow its alignment with the new pipe section above. In contrast, stinger 27 is utilized only to stabilize the upper end 25 of pipeline 3 for welding. New pipe section 30 has a lower end 31 for welding to the upper end 25 of pipeline 3. As will be discussed later, the new pipe section 30 is flexed to align with the natural position of the upper end 20 of pipeline 3.

New pipe section 35 is shown in an alternate position to new pipe section 30, illustrating the degree of movement which the flexing of the new pipe sections of this invention allows.

Pipe section 18 is shown attached to track 19 and swung down as new pipe section 20 using a connector 40. The new pipe section 20 moves around the track 19 at positions 41, 42, and 43. Finally, the new pipe section is pulled up into the mast 2 as new pipe section 50. When the mast 2 can handle longer new pipe sections than the vessel 1 can weld together from shorter pipe sections, shorter sections can be pulled up into the mast in sequence and welded together generally in the area indicated as 51. In special cases such as when the deck of the vessel can only deliver doubles of pipe and the tower can handle sextuples, 2 preparation welds can be required for every actual pipeline weld. This means that 2 separate pipe stations would be required at 51, or alternately a second weld station can be established part way up the mast 2.

Figure 3:
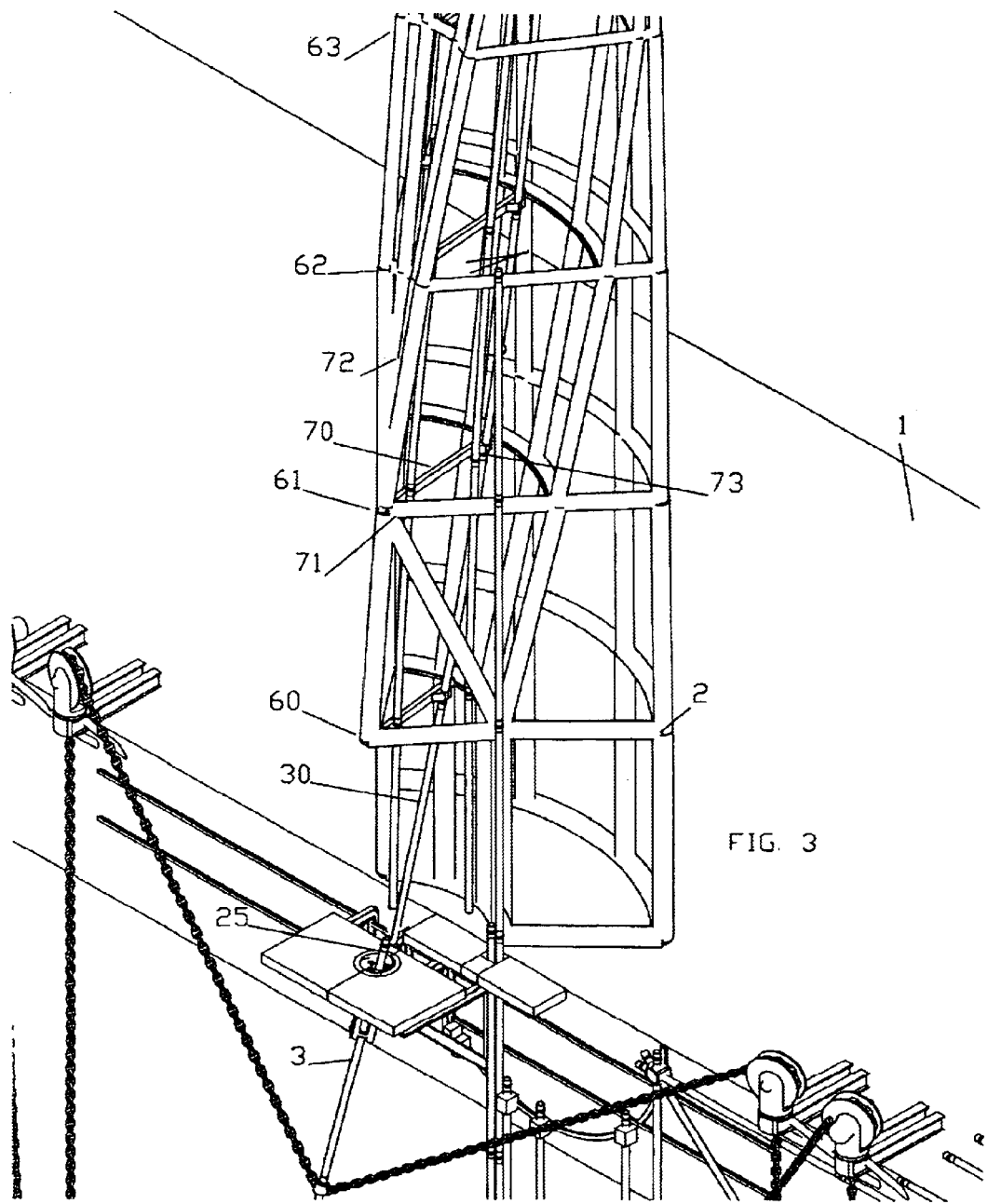
FIG. 3 is a perspective view of the lower section of the mast.

Referring now to FIG. 3, several flexing sections 60, 61, 62, and 63 are shown engaging the new pipe section 30. In flexing section 61, arm 70 engages a pivot point 71 near the front and a circular track 72 at the rear. The arm 70 has a connector 73 attached which can move along the length of arm 70. The movement of arm 70 and connector 73 are remotely controlled to flex the new pipe section 30 to be axially aligned with the upper end 25 of new pipe section 3 and within the area of the tower.

Figure 4:
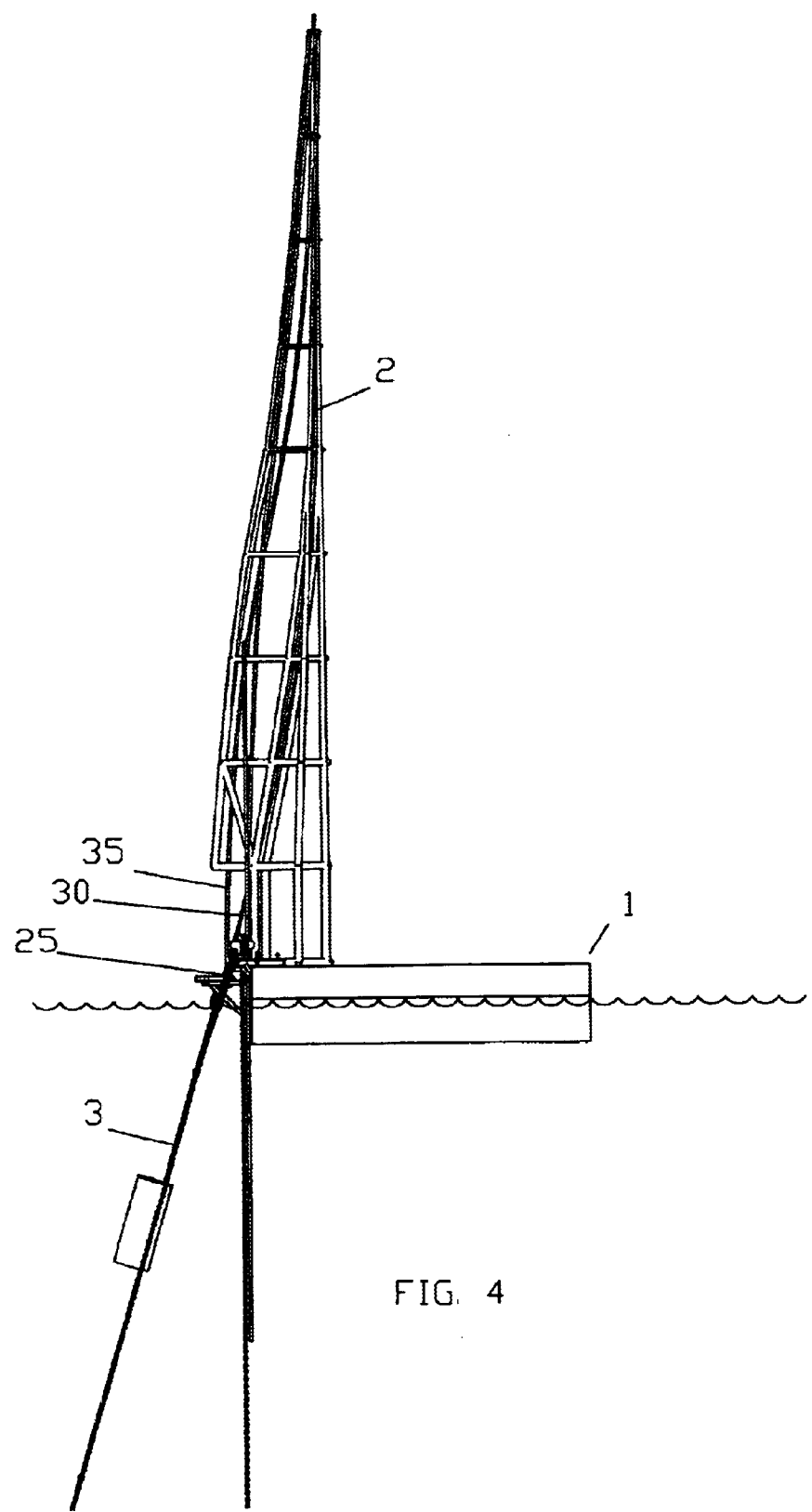
FIG. 4 is a view of the mast from the front of the vessel.

Referring now to FIG. 4, in a conventional tower the upper section of the suspended pipeline is bent to align with the mast. In this invention, the upper end 25 of the pipeline 3 is not bent to align with the mast 2, but rather remains in its natural angle. In the variety of angles available for the pipeline, the upper end of the new pipe section 30 would tend to be a large cone. For a sextuple new pipe section, it would be a very large cone. In this invention, rather than accommodating a very large cone, the mast and the associated arms bends the new pipe section such that the top of the new pipe section is always in the same location. The top of the mast 2 is actually very small rather than a very large cone. This is facilitated because to bend the pipeline under tension below the support point is very difficult. To bend or flex the new pipe section while it is not under tension is much easier.

Referring again to FIG. 1, skid 80 is shown mounted above the support connector 8. This means that the skid 80 can be welded into the pipeline 3 while above the split work table 26. The split work table 26 can be separated along tracks 81 and the skid 80 lowered. The connector 14 can be reattached to the pipeline above the skid 80 allowing the connector 8 to be released and reattached above the skid 80. This process greatly simplifies the process of handling mid-pipeline skids such as 80.

The particular embodiments disclosed above are illustrative only, as the invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such variations are considered within the scope and spirit of the invention. Accordingly, the protection sought herein is as set forth in the claims below.

We claim:

1. A method of j-laying pipes from a vessel on the surface of the water to the ocean floor comprising
   a mast in a fixed position relative to said vessel, said mast holding a new pipe section,
   a pipeline suspended from said vessel at an angle with respect to said mast such that the upper end of said pipeline is not axially aligned with said mast,
   alternately welding said new pipe sections onto said upper end of said pipeline to become part of said pipeline and lowering the combination of said pipeline and said new pipe section,
   said new pipe section being flexed such that said lower end of said new pipe section is axially aligned with said upper end of said pipeline,
   wherein said pipeline is suspended from said vessel with winches, and
   wherein a first pair of winches cooperate with a first connector to support said pipeline while a second connector is released for movement and alternately a second pair of winches cooperate with said second connector to support said pipeline while said first connector is moved in order to lower said pipeline.

2. A method of j-laying pipes from a vessel on the surface of the water to the ocean floor comprising
   a mast in a fixed position relative to said vessel, said mast holding a new pipe section,
   a pipeline suspended from said vessel at an angle with respect to said mast such that the upper end of said pipeline is not axially aligned with said mast,
   alternately welding said new pipe sections onto said upper end of said pipeline to become part of said pipeline and lowering the combination of said pipeline and said new pipe section,
   said new pipe section being flexed such that said lower end of said new pipe section is axially aligned with said upper end of said pipeline,
   wherein a multiplicity of arms are provided to flex said new pipe section, and
   wherein said arms are mounted on circular tracks for movement around said mast.

3. A method of j-laying pipes from a vessel on the surface of the water to the ocean floor comprising
   a mast in a fixed position relative to said vessel, said mast holding a new pipe section,
   a pipeline suspended from said vessel at an angle with respect to said mast such that the upper end of said pipeline is not axially aligned with said mast,
   alternately welding said new nine sections onto said upper end of said pipeline to become part of said pipeline and lowering the combination of said pipeline and said new pipe section,
   said new pipe section being flexed such that said lower end of said new pipe section is axially aligned with said upper end of said pipeline, and
   wherein said new pipe section is brought to the mast for attachment to the upper end of said pipeline by lowering into the water and pulling up into said mast.

4. The invention of claim 3, wherein said new pipe section is brought to said mast in 2 or more pipe pieces for welding together to form said new pipe section.

5. The invention of claim 4, wherein said 2 or more pipe pieces are formed of pipe joints welded together on the deck of said vessel.

6. A method of j-laying pipes from a vessel on the surface of the water to the ocean floor comprising
suspending the upper end of a pipeline below a vessel on a multiplicity of flexible lines from winches and controlling said winches to position said upper end of said pipeline below a mast,
said mast being mounted at a fixed angle with respect to said vessel,
suspending a new pipe section to be welded to the said upper end of said pipeline in said mast,
using a multiplicity of arms to flex said new pipe section such that the lower end of said new pipe section is axially aligned with said upper end of said pipeline,
welding said lower end of said new pipe section to said upper end of said pipeline, and
lowering said pipeline.

7. The invention of claim 6, wherein said pipeline is suspended from said vessel alternately with two sets of said winches.

8. The invention of claim 7, wherein said winches use chain to suspend said pipeline.

9. The invention of claim 6, wherein said multiplicity of arms are provided to flex said new pipe section.

10. The invention of claim 9, wherein said arms are mounted on circular tracks for movement around said mast.

11. The invention of claim 6, wherein said new pipe sections are keelhauled below said vessel to deliver them to said mast.

12. The invention of claim 6, further comprising weathervaning said vessel about said pipeline, using said multiplicity of arms to keep the lower end of said new pipe section aligned with said upper end of said pipeline.

13. The invention of claim 6, wherein the first pair of said winches connected to a first connector support said pipeline while the second pair of said winches connected to a second connector adjusts to a different holding position.

14. The invention of claim 6, wherein the first pair of said winches are connected to a first connector supporting said pipeline while the second pair of said winches are connected to a second connector to be released from said pipeline to pass an object larger than said pipeline.

15. A method of j-laying pipes from a vessel on the surface of the water to the ocean floor comprising
a mast mounted on a floating vessel,
suspending pipe sections in the water,
bringing said suspended pipe sections up out of the water and into said mast,
welding 2 or more said suspended pipe sections together to make a longer pipe section,
suspending a pipeline being laid from said vessel by a multiplicity of winches, said suspended pipeline having an upper end,
welding the lower end of said longer pipe section to said upper end of said pipeline, and
using said multiplicity of winches to lower said combination of said pipeline and said longer pipe section.

16. The invention of claim 15, wherein said mast is fixed relative to said vessel.

17. The invention of claim 15, wherein the first pair of said winches connected to a first connector support said pipeline while the second pair of said winches connected to a second connector adjusts to a different holding position.

18. The invention of claim 15, wherein the first pair of said winches are connected to a first connector supporting said pipeline while the second pair of said winches are connected to a second connector to be released from said pipeline to pass an object larger than said pipeline.

19. The invention of claim 15, wherein said a multiplicity of arms are provided to flex said new pipe section.

20. The invention of claim 19, wherein said arms are mounted on circular tracks for movement around said mast.

21. The invention of claim 15, wherein said new pipe sections are keelhauled below said vessel to deliver them to said mast.

22. The invention of claim 15, further comprising weathervaning said vessel about said pipeline and using said multiplicity of arms to keep the lower end of said new pipe section aligned with said upper end of said pipeline.

23. The invention of claim 15, wherein the first pair of said winches connected to a first connector support said pipeline while the second pair of said winches connected to a second connector adjusts to a different holding position.

24. The invention of claim 15, wherein the first pair of said winches are connected to a first connector supporting said pipeline while the second pair of said winches are connected to a second connector to be released from said pipeline to pass an object larger than said pipeline.

25. The invention of claim 15, wherein the welding together of said 2 or more pipe sections occurs proximate the base of said mast.

26. The invention of claim 15, wherein 2 or more weld stations are provided proximate the base of said mast for welding 2 or more new pipe sections together at the same time.

27. The invention of claim 15 wherein a first weld station is provided proximate the base of said mast and a second weld station is provided higher in said mast to allow two welds to be made on said new pipe section at the same time.

\* \* \* \* \*